United States Patent
Wang et al.

(10) Patent No.: US 11,788,988 B1
(45) Date of Patent: Oct. 17, 2023

(54) SYSTEM AND METHOD FOR MEASURING SLUDGE MOISTURE CONTENT BY ULTRASOUND

(71) Applicant: Zhejiang University, Hangzhou (CN)

(72) Inventors: Fei Wang, Hangzhou (CN); Jinhui Fan, Hangzhou (CN); Wenyuan Wang, Hangzhou (CN); Haibin Cui, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/125,532

(22) Filed: Mar. 23, 2023

(30) Foreign Application Priority Data

May 26, 2022 (CN) .......................... 202210588969.X

(51) Int. Cl.
*G01N 29/028* (2006.01)
*G01N 29/44* (2006.01)
(Continued)

(52) U.S. Cl.
CPC ......... *G01N 29/028* (2013.01); *G01N 29/343* (2013.01); *G01N 29/40* (2013.01); *G01N 29/4418* (2013.01)

(58) Field of Classification Search
CPC .............. G01N 29/028; G01N 29/343; G01N 29/4418; G01N 29/40
(Continued)

(56) References Cited

U.S. PATENT DOCUMENTS 5,835,454 A * 11/1998 Maltby ................. C02F 1/36
367/908
6,212,943 B1 * 4/2001 Maltby ................. G01N 29/036
73/61.49
(Continued)

FOREIGN PATENT DOCUMENTS

CA 2270398 A1 * 10/1996
CN 102838187 A * 12/2012
(Continued)

OTHER PUBLICATIONS

Translation WO-2016181063-A1 (Year: 2016).*
(Continued)

*Primary Examiner* — Mischita L Henson
*Assistant Examiner* — Monica S Young
(74) *Attorney, Agent, or Firm* — Zhigang Ma

(57) ABSTRACT

A system and method for measuring a sludge moisture content by ultrasound are provided, which relate to the technical field of sludge detection. The system includes: a measuring container, configured to load sludge; a pulse signal generator, configured to generate a pulse signal; a self-transmitting self-receiving (STSR) transducer, disposed on an outer wall of the measuring container, and configured to transmit a first ultrasonic signal into the measuring container under an excitation of the pulse signal and receive a second ultrasonic signal reflected from an inner wall of the measuring container; and an upper computer, configured to build a first mathematical model among a reflection coefficient, sludge acoustic impedance, and wall acoustic impedance of the measuring container, and build a second mathematical model between the sludge acoustic impedance and the sludge moisture content.

5 Claims, 2 Drawing Sheets

(51) Int. Cl.
  *G01N 29/34* (2006.01)
  *G01N 29/40* (2006.01)
(58) Field of Classification Search
  USPC ........................................................ 73/64.53
  See application file for complete search history.

(56) References Cited

U.S. PATENT DOCUMENTS

| | | | | |
|---|---|---|---|---|
| 6,401,538 B1 * | 6/2002 | Han | ......................... | G01N 9/24 |
| | | | | 73/865.5 |
| 2013/0284271 A1 * | 10/2013 | Lipkens | ................ | B06B 1/0644 |
| | | | | 137/544 |
| 2017/0191022 A1 * | 7/2017 | Lipkens | .................. | C12M 29/02 |

FOREIGN PATENT DOCUMENTS

| | | | | | | |
|---|---|---|---|---|---|---|
| CN | 106430408 | A | * | 2/2017 | ................ | C02F 1/36 |
| CN | 213253162 | U | * | 5/2021 | | |
| CN | 218212766 | U | * | 1/2023 | | |
| EP | 3680629 | A1 | * | 7/2020 | | |
| GB | 2481831 | A | * | 1/2012 | ............... | G01N 9/24 |
| JP | S6275456 | U | * | 10/1985 | | |
| JP | 2003194614 | A | * | 7/2003 | | |
| JP | 2003215112 | A | * | 7/2003 | | |
| JP | 2008164362 | A | * | 7/2008 | | |
| RU | 2740869 | C1 | * | 1/2021 | ........... | G01N 27/026 |
| WO | WO-2012168032 | A1 | * | 12/2012 | ............. | G01N 27/07 |
| WO | WO-2016181063 | A1 | * | 11/2016 | | |

OTHER PUBLICATIONS

Translation EP-3680629-A1 (Year: 2020).*
Translation CN-218212766-U (Year: 2023).*
CNIPA, Notification of a First Office Action for CN202210588969. X, dated Nov. 23, 2022.
Zhejiang University (Applicant), Reply to Notification of a First Office Action for CN202210588969.X, w/ (allowed) replacement claims, dated Nov. 23, 2022.
CNIPA, Notification to grant patent right for invention in CN202210588969.X, dated Dec. 2, 2022.

* cited by examiner

SYSTEM AND METHOD FOR MEASURING SLUDGE MOISTURE CONTENT BY ULTRASOUND

TECHNICAL FIELD

The disclosure relates to the technical field of sludge detection, and particularly to a system and method for measuring a sludge moisture content by ultrasound.

BACKGROUND

With the rapid development of urbanization and industrialization, the burden of urban sewage treatment is gradually increasing, making the amount of excess sludge also increase year by year. The sludge contains a large number of pathogenic microorganisms, heavy metals such as mercury, chromium, lead, and many harmful substances that are difficult to be degraded, posing a great threat to the environment and human life and health, thus the stabilization, harmless and economic treatment of sludge is of great significance. The measurement of sludge moisture content is of great significance, since the sewage sludge discharge standard of urban sewage treatment plants clearly stipulates that sludge should be dewatered, and the moisture content of the sludge should be less than 80%. In order to reduce the moisture content of treated sludge, such as sludge drying, generally requires a lot of energy. Therefore, in order to meet the discharge standard and reduce costs, the measurement of sludge moisture content is very important.

There are few methods for measuring a sludge moisture content. At present, a traditional gravimetric method is usually used to obtain the sludge moisture content. This method has complex operation steps, takes a long time, and has certain limitations. In addition, such as a patent with an application number of CN114018956A, it discloses a device and method for detecting a sludge moisture content by microwave method, mainly including a cavity, feeding components, detection components, and cleaning components. However, in general, this method involves many steps and devices, and has certain limitations in application scenarios. Therefore, how to develop a system and method for measuring the sludge moisture content with a simple structure and unlimited application scenarios is one of the difficult problems to be solved.

SUMMARY

In order to solve at least one problem mentioned in the background, a purpose of the disclosure is to provide a system and method for measuring a sludge moisture content by ultrasound. The technical solutions of the disclosure are simpler and more convenient, are not limited in application scenarios, and have better application prospects.

To achieve the above purpose, the disclosure provides the technical solutions as follows.

A system for measuring a sludge moisture content by ultrasound, including:
- a measuring container, configured to load sludge;
- a pulse signal generator, configured to generate a pulse signal;
- a self-transmitting self-receiving (STSR) transducer, disposed on an outer wall of the measuring container, and configured to transmit a first ultrasonic signal into the measuring container under an excitation of the pulse signal and receive a second ultrasonic signal reflected from an inner wall of the measuring container; and
- an upper computer, configured to build a first mathematical model among a reflection coefficient, sludge acoustic impedance, and wall acoustic impedance of the measuring container, and build a second mathematical model between the sludge acoustic impedance and the sludge moisture content; calculate an amplitude ratio between the second ultrasonic signal and the first ultrasonic signal to obtain the reflection coefficient; substitute the reflection coefficient into the first mathematical model to obtain the sludge acoustic impedance; substitute the sludge acoustic impedance into the second mathematical model to obtain the sludge moisture content.

In an embodiment, the measuring container is made of polymethyl methacrylate.

In an embodiment, the first mathematical model is:

$$R = (Z_w - Z_{arc})/(Z_w + Z_{arc})$$

where R represents the reflection coefficient, $Z_w$ represents the sludge acoustic impedance, and $Z_{arc}$ represents the wall acoustic impedance of the measuring container.

In an embodiment, the second mathematical model is:

$$Z_w = Z_1 * i + Z_2 * (1-i)$$

where $Z_w$ represents the sludge acoustic impedance, $Z_1$ represents water acoustic impedance, $Z_2$ represents dry sludge acoustic impedance, and i represents the sludge moisture content.

A method for measuring a sludge moisture content by ultrasound, including:
- S0: building a first mathematical model among a reflection coefficient, sludge acoustic impedance, and wall acoustic impedance of a measuring container; and building a second mathematical model between the sludge acoustic impedance and the sludge moisture content;
- S1: putting sludge to be measured into the measuring container;
- S2: transmitting a first ultrasonic signal from an outer wall of the measuring container into the measuring container; and receiving a second ultrasonic signal reflected from an inner wall of the measuring container; and
- S3: calculating an amplitude ratio between the second ultrasonic signal and the first ultrasonic signal to obtain the reflection coefficient; substituting the reflection coefficient into the first mathematical model to obtain the sludge acoustic impedance; substituting the deduced sludge acoustic impedance into the second mathematical model to obtain the sludge moisture content.

In an embodiment, the measuring container is made of polymethyl methacrylate.

In an embodiment, the first mathematical model is:

$$R = (Z_w - Z_{arc})/(Z_w + Z_{arc})$$

where R represents the reflection coefficient, $Z_w$ represents the sludge acoustic impedance, and $Z_{arc}$ represents the wall acoustic impedance of the measuring container.

In an embodiment, the second mathematical model is:

$$Z_w = Z_1 * i + Z_2 * (1-i)$$

where $Z_w$ represents the sludge acoustic impedance, $Z_1$ represents water acoustic impedance, $Z_2$ represents dry sludge acoustic impedance, and i represents the sludge moisture content.

Compared with the prior art, the beneficial effect of the disclosure is that the first ultrasonic signal of the disclosure will be reflected when it passes through the wall of the measuring container and touches the sludge in the measuring container, and the reflected second ultrasonic signal will be collected to the upper computer, and the amplitude ratio between the second ultrasonic signal and the first ultrasonic signal is taken as the reflection coefficient. The reflection coefficient can also be obtained from a relationship between the sludge acoustic impedance and the wall acoustic impedance of the measuring container, the wall acoustic impedance of the measuring container is invariable, and the sludge acoustic impedance with different moisture contents can be obtained by normalizing a ratio coefficient between the sludge acoustic impedance and the wall acoustic impedance of the measuring container. The reflection coefficient of the wall affected by the different sludge moisture contents is also different, and thus a quantitative relationship between the reflection coefficient and the sludge moisture content can be determined. Then, after the amplitude of the second ultrasonic signal is obtained, the reflection coefficient is obtained by dividing the amplitude of the first ultrasonic signal, and the sludge moisture content is inversely deduced by using the quantitative relationship between the two. This scheme of the disclosure is simpler and more convenient, and is not limited in application scenarios, and has better application prospects.

DESCRIPTION OF REFERENCE NUMERALS

1—measuring container; 2—self-transmitting and self-receiving (STSR) transducer; 3—pulse signal generator; 4—signal acquisition card; 5—upper computer.

DETAILED DESCRIPTION OF EMBODIMENTS

The following is a clear and complete description of the technical solution in the embodiments of the disclosure. Apparently, the described embodiments are only part of the embodiments of the disclosure, not all of them. Based on the embodiments of the disclosure, all other embodiments obtained by those ordinary skilled in the art without creative work should fall within the scope of protection of the disclosure.

Embodiment 1

Figure 1:
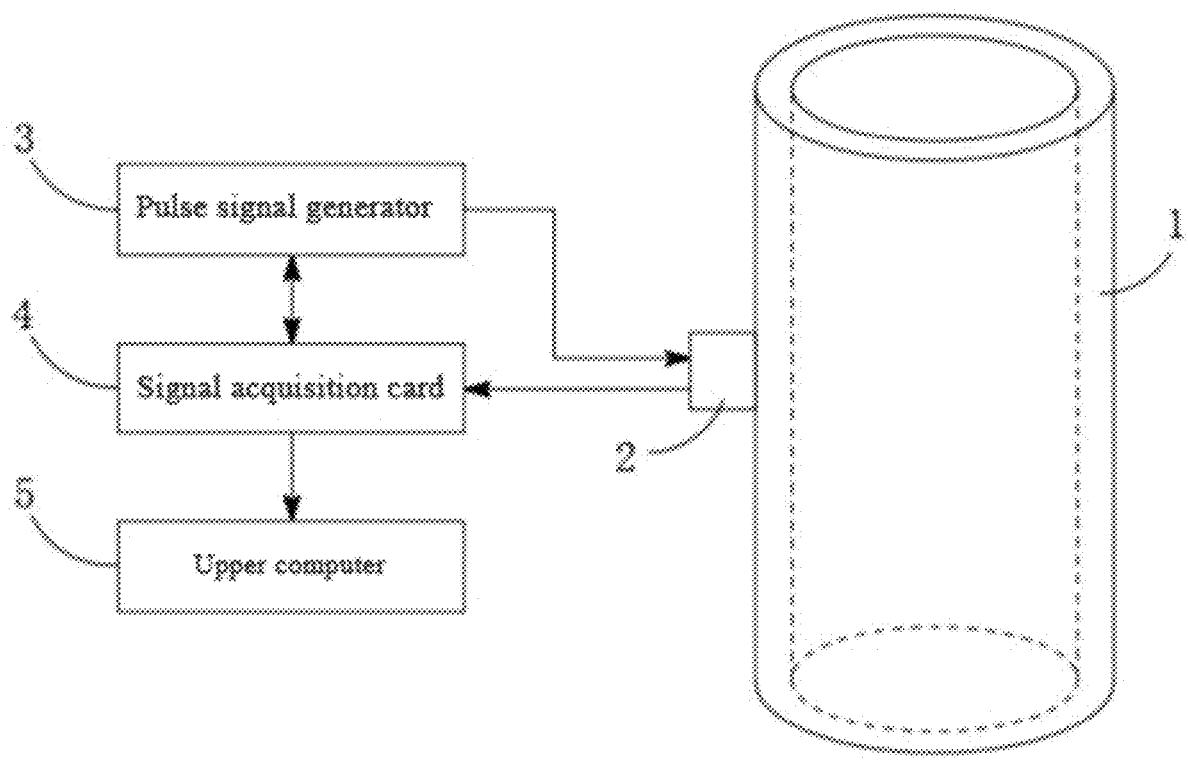
FIG. 1 is a schematic structural diagram of the system of the disclosure.

Please refer to FIG. 1, a system for measuring a sludge moisture content (also referred to as moisture content) by ultrasound is provided in this embodiment, and the system includes: a measuring container 1, a self-transmitting and self-receiving (STSR) transducer 2, a pulse signal generator 3 and an upper computer 5.

The measuring container 1 is configured to load sludge whose moisture content is to be measured. In order to ensure that wall acoustic impedance of the measuring container 1 is different from acoustic impedance of the sludge (also referred to as sludge acoustic impedance), the measuring container 1 is made of polymethyl methacrylate.

The pulse signal generator 3 is configured to generate a pulse signal with adjustable intensity, cycle and duty ratio, and to control the STSR transducer 2 to transmit ultrasonic signals of certain intensity in to the measuring container 1 filled with the sludge.

The STSR transducer 2 is disposed on an outer wall of the measuring container 1, and configured to transmit a first ultrasonic signal into the measuring container 1 under an excitation of the pulse signal and receive a second ultrasonic signal reflected from an inner wall of the measuring container 1.

During a process of the first ultrasonic signal entering the sludge through the wall of the measuring container 1 made of polymethyl methacrylate, due to the different acoustic impedance of the polymethyl methacrylate and the sludge, reflection and transmission will occur on the wall of the measuring container 1 made of polymethyl methacrylate, that is, part of the first ultrasonic signal will be reflected and received by the STSR transducer 2, while the other part of the first ultrasonic signal will continue to propagate forward into the sludge. In the process, a probability of the reflection (that is, the reflection coefficient) is determined by relative values of the acoustic impedance of the polymethyl methacrylate and the acoustic impedance of the sludge (acoustic impedance is a product of medium density and acoustic velocity), the reflection coefficient R is defined as a ratio of a difference between the sludge acoustic impedance and the polymethyl methacrylate to a sum of the sludge acoustic impedance and the polymethyl methacrylate:

$$R=(Z_w-Z_{arc})/(Z_w+Z_{arc}) \quad (1)$$

where R represents the reflection coefficient, $Z_w$ represents the sludge acoustic impedance, and $Z_{arc}$ represents the wall acoustic impedance of the measuring container 1; a reason why the measuring container 1 is made of polymethyl methacrylate is that the acoustic impedance of the polymethyl methacrylate is close to water acoustic impedance, so as to ensure that the ultrasonic signals can not only enter the sludge from the polymethyl methacrylate, but also return to the polymethyl methacrylate from the sludge and be detected by a probe.

The upper computer 5 is configured to build a first mathematical model (that is, the above formula (1)) among the reflection coefficient, the sludge acoustic impedance, and the wall acoustic impedance of the measuring container 1; and build a second mathematical model between the sludge acoustic impedance and the sludge moisture content.

Sludge is the product of sewage treatment. It is an extremely complex heterogeneous body composed of organic debris, bacterial body, inorganic particles, colloid, etc. Its main characteristics include high moisture content (up to 99%), high organic content, easy to decompose and stink, fine particles, and small specific gravity. The sludge is a colloidal liquid which is a substance between liquid and solid. For different kinds of sludge, the content of organic matter is different, but in general, for different kinds of sludge with the same moisture content, the acoustic velocity and density can be regarded as the same, that is, the acoustic impedance of the different kinds of sludge is the same, so that this method can be applied to different kinds of sludge.

The second mathematical model is:

$$Z_w=Z_1{}^*i+Z_2{}^*(1-i) \quad (2)$$

where $Z_w$ represents the sludge acoustic impedance, $Z_1$ represents the water acoustic impedance, $Z_2$ represents dry sludge acoustic impedance, and i represents the sludge moisture content.

An amplitude ratio between the second ultrasonic signal and the first ultrasonic signal is calculated to obtain the reflection coefficient. The reflection coefficient is substituted into the first mathematical model to inversely deduce the sludge acoustic impedance; and the deduced sludge acoustic impedance is substituted into the second mathematical model to obtain the sludge moisture content.

The following TABLE 1 shows density, acoustic velocity and acoustic impedance parameters of the polymethyl methacrylate, water and dry sludge involved in the embodiment.

TABLE 1 a parameter table including density, acoustic velocity and acoustic impedance of the polymethyl methacrylate, water and dry sludge.

| | Density ($kg/m^3$) | Acoustic velocity (m/s) | Acoustic impedance ($10^3$ $kg/m^2 \cdot s$) |
|---|---|---|---|
| Polymethyl methacrylate | 1200 | 1700 | 2040 |
| Water | 1000 | 1496.6 | 1496.6 |
| Dry sludge | 2600 | 1800 | 4680 |

According to formula (2), the sludge acoustic impedance $Z_{w(i)}$ with different moisture contents can be calculated:

$$Z_{w(i)} = Z_1 \times i + Z_2 \times (1-i) = 1496.6i + 4680(1-i).$$

The sludge acoustic impedance with different moisture contents is substituted into the formula (1) to obtain the reflection coefficient R(i):

$$R(i) = (Z_{w(i)} - Z_{arc})/(Z_{w(i)} + Z_{arc}).$$

The following TABLE 2 shows the reflectivity at an interface between the polymethyl methacrylate and the sludge acoustic impedance with different moisture contents.

TABLE 2 eflectivity at the interface between the polymethyl methacrylate and the sludge acoustic impedance with different moisture contents.

| Sludge moisture content (%) | Sludge acoustic impedance ($10^3$ $kg/m^2 \cdot s$) | Reflection coefficient |
|---|---|---|
| 0 | 4680 | 0.392857 |
| 10 | 4361.66 | 0.362665 |
| 20 | 4043.32 | 0.329314 |
| 30 | 3724.98 | 0.292279 |
| 40 | 3406.64 | 0.250914 |
| 50 | 3088.30 | 0.204415 |
| 60 | 2769.96 | 0.151760 |
| 70 | 2451.62 | 0.091642 |
| 80 | 2133.28 | 0.022352 |
| 90 | 1814.94 | -0.05838 |
| 100 | 1496.60 | -0.15365 |

Figure 2:
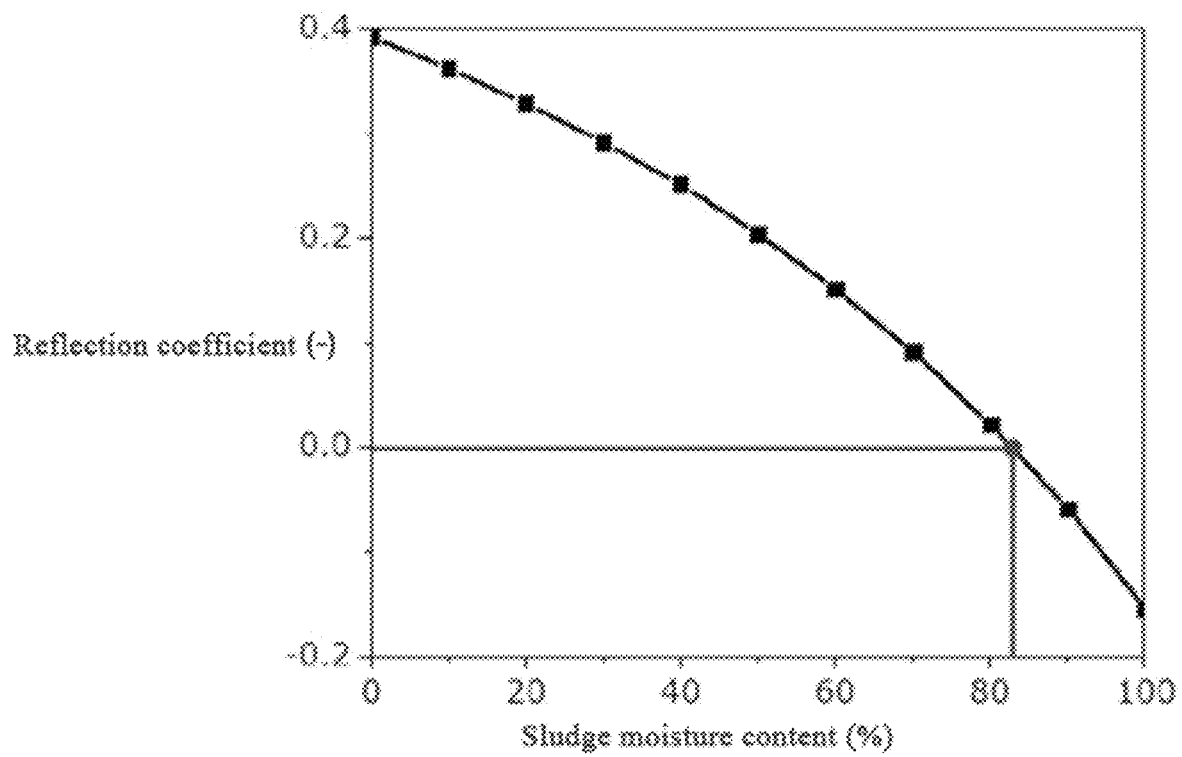
FIG. 2 is a schematic diagram that shows a corresponding relationship between reflection coefficients and sludge moisture contents of the disclosure.
Figure 3:
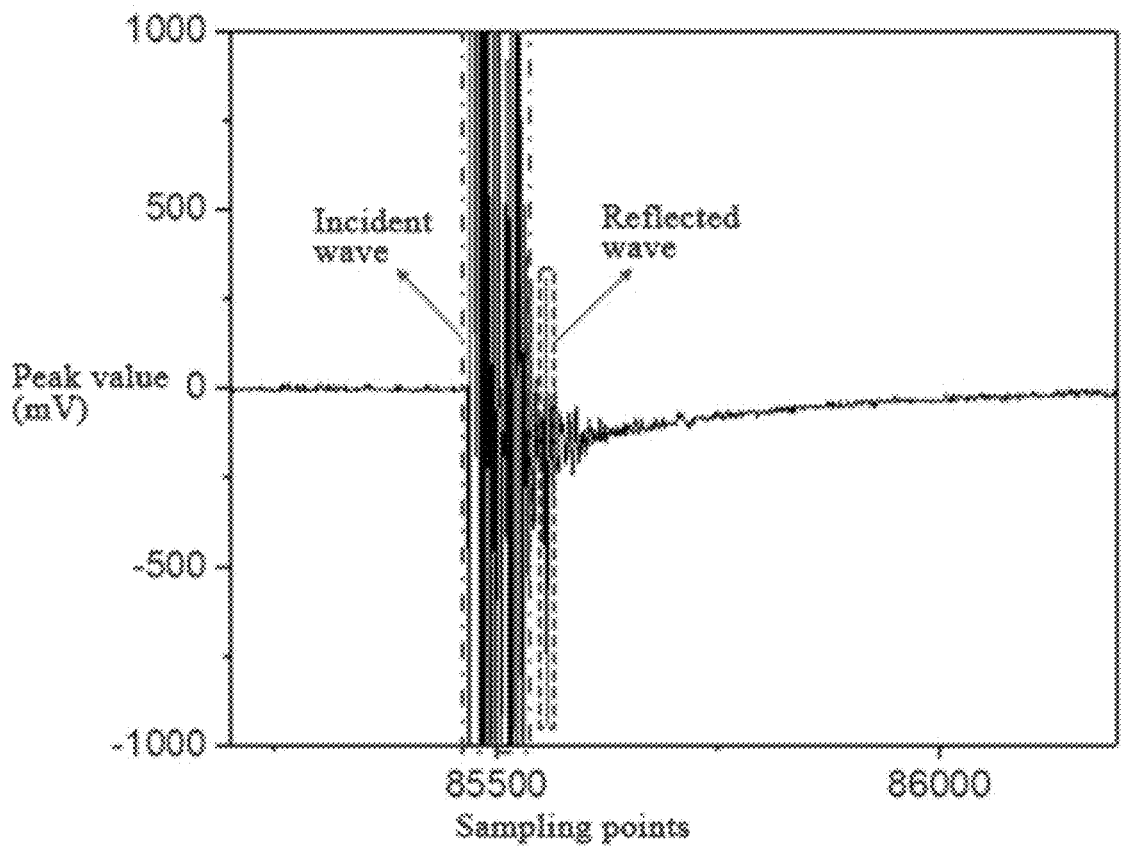
FIG. 3 is a schematic diagram of a first ultrasonic signal and a second ultrasonic signal of the disclosure.
Figure 4:
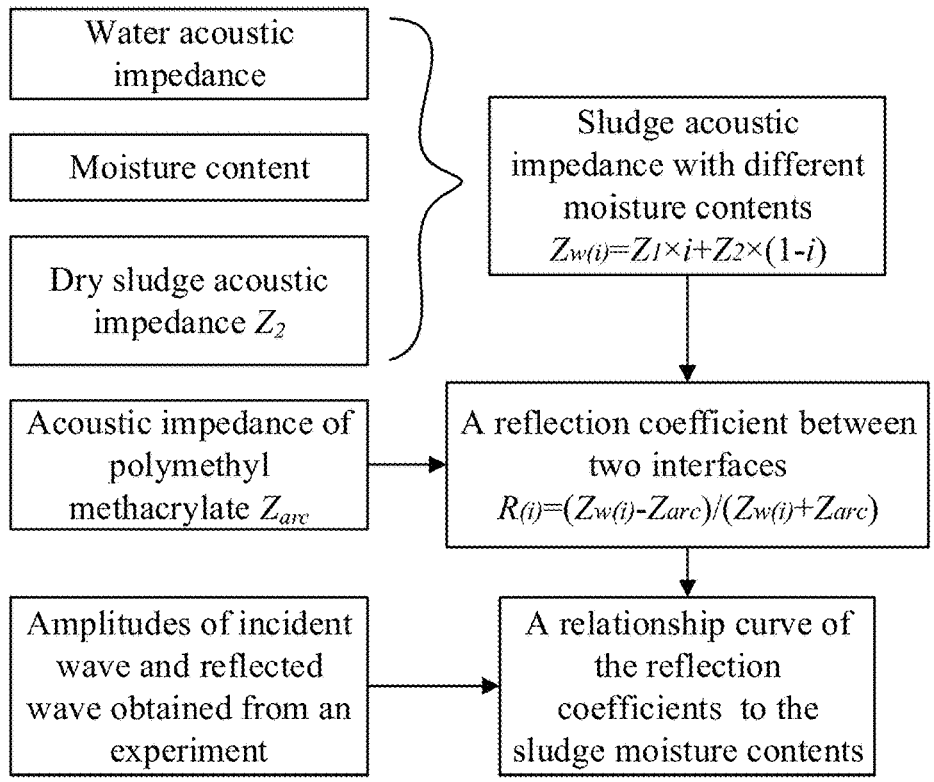
FIG. 4 is a flow chart of the method of the disclosure.

As shown in FIG. 4, in the embodiment, firstly, the sludge acoustic impedance with different moisture contents is calculated by the normalized calculation of the formula (2), and then the reflection coefficient of the interface between the polymethyl methacrylate and the sludge with different moisture contents is obtained by the formula (1). As shown in FIG. 2, a corresponding quantitative relationship between the reflection coefficients and the sludge moisture contents is found and taken as a prediction model. After that, by the STSR transducer 2, the first ultrasonic signal is transmitted and the reflected signal (i.e. the second ultrasonic signal) at the interface between the sludge and the wall of the polymethyl methacrylate is received. Please refer to FIG. 3 and calculate the amplitude ratio between the first ultrasonic signal (incident wave) and the second ultrasonic signal (reflected wave), thereby obtaining a reflection coefficient R. The reflection coefficient R is substituted into the prediction model to get a sludge moisture content at this time.

However, it can be seen from FIG. 2 that the prediction model obtained by this method is only applicable to sludge with a moisture content lower than 82.8%. In the case of a higher sludge moisture content, the ultrasonic reflection at the interface is relatively weak, and the measurement effect is poor. However, in the sewage sludge discharge standard of urban sewage treatment plant, it is clearly stipulated that sludge should be dewatered, and its moisture content should be less than 80%. Therefore, in general, the system and method of the disclosure can play an effective role in the measurement of sludge moisture content, the principle is easy to understand, and the operation is simple, which is very suitable for the measurement of sludge moisture content in industrial sites.

Embodiment 2

A method for measuring a sludge moisture content by ultrasound is provided in this embodiment, including the steps S0 to S3.

S0: building a first mathematical model among a reflection coefficient, sludge acoustic impedance, and wall acoustic impedance of a measuring container 1; and building a second mathematical model between the sludge acoustic impedance and the sludge moisture content. Specifically, the first mathematical model is:

$$R = (Z_w - Z_{arc})/(Z_w + Z_{arc});$$

where R represents the reflection coefficient, $Z_w$ represents the sludge acoustic impedance, and $Z_{arc}$ represents the wall acoustic impedance of the measuring container 1.

Furthermore, the second mathematical model is:

$$Z_w = Z_1 {}^* i + Z_2 {}^* (1-i);$$

where $Z_w$ represents the sludge acoustic impedance, $Z_1$ represents water acoustic impedance, $Z_2$ represents dry sludge acoustic impedance, and i represents the sludge moisture content.

S1: putting sludge to be measured into the measuring container 1.

S2: transmitting a first ultrasonic signal from an outer wall of the measuring container 1 into the measuring container 1; and receiving a second ultrasonic signal reflected from an inner wall of the measuring container 1.

S3: calculating an amplitude ratio between the second ultrasonic signal and the first ultrasonic signal to obtain the reflection coefficient; substituting the reflection coefficient into the first mathematical model to obtain the sludge acoustic impedance; substituting the deduced sludge acoustic impedance into the second mathematical model to obtain the sludge moisture content.

The specific principle of the embodiment 2 is the same as that described in the embodiment 1 and will not be repeated herein.

For those skilled in the art, it is apparent that the disclosure is not limited to the details of the above exemplary embodiments, and can be realized in other specific forms without departing from the spirit or basic features of the disclosure. Therefore, from any point of view, the embodiments should be regarded as exemplary and non-restrictive. The scope of the disclosure is limited by the appended claims rather than the above description. Therefore, it is intended to include all changes falling within the meaning and scope of the elements equivalent to the claims in the disclosure.

What is claimed is:

1. A system for measuring a sludge moisture content by ultrasound, comprising:
   a measuring container, configured to load sludge;
   a pulse signal generator, configured to generate a pulse signal;
   a self-transmitting and self-receiving (STSR) transducer, disposed on an outer wall of the measuring container, and configured to transmit a first ultrasonic signal into the measuring container loaded with the sludge under an excitation of the pulse signal and receive a second ultrasonic signal reflected from an inner wall of the measuring container; and
   a computer, configured to build a first formula representing a relationship among a reflection coefficient, sludge acoustic impedance, and wall acoustic impedance of the measuring container, and build a second formula representing a relationship between the sludge acoustic impedance and the sludge moisture content; calculate an amplitude ratio between the second ultrasonic signal and the first ultrasonic signal; take the amplitude ratio as the reflection coefficient to substitute into the first formula to obtain the sludge acoustic impedance; substitute the sludge acoustic impedance into the second formula to obtain the sludge moisture content; wherein the sludge is dried based on the sludge moisture content until a moisture content value of 80% is achieved;
   wherein the first formula is as follows:

$Z_w = Z_{arc}(1+R)/(1-R)$;

where R represents the reflection coefficient, $Z_w$ represents the sludge acoustic impedance, and $Z_{arc}$ represents the wall acoustic impedance of the measuring container;
   wherein the second formula is as follows:

$i = (Z_w - Z_2)/(Z_1 - Z_2)$;

where $Z_w$ represents the sludge acoustic impedance, $Z_1$ represents water acoustic impedance, $Z_2$ represents dry sludge acoustic impedance, and i represents the sludge moisture content.

2. The system for measuring the sludge moisture content by ultrasound according to claim 1, wherein the measuring container is made of polymethyl methacrylate.

3. A method for measuring a sludge moisture content by ultrasound, comprising:
   S0: building a first formula representing a relationship among a reflection coefficient, sludge acoustic impedance, and wall acoustic impedance of a measuring container; and building a second formula representing a relationship between the sludge acoustic impedance and the sludge moisture content;
   S1: putting sludge to be measured into the measuring container;
   S2: transmitting a first ultrasonic signal from an outer wall of the measuring container into the measuring container; and receiving a second ultrasonic signal reflected from an inner wall of the measuring container; and
   S3: calculating an amplitude ratio between the second ultrasonic signal and the first ultrasonic signal; taking the amplitude ratio as the reflection coefficient to substitute into the first formula to obtain the sludge acoustic impedance; substituting the deduced sludge acoustic impedance into the second formula to obtain the sludge moisture content; drying the sludge until the moisture content value is less than 80% when the sludge moisture content is not less than 80%; and discharging the sludge when the sludge moisture content is less than 80%;
   wherein the first formula is as follows:

$Z_w = Z_{arc}(1+R)/(1-R)$;

where R represents the reflection coefficient, $Z_w$ represents the sludge acoustic impedance, and $Z_{arc}$ represents the wall acoustic impedance of the measuring container;
   wherein the second formula is as follows:

$i = (Z_w - Z_2)/(Z_1 - Z_2)$;

where $Z_w$ represents the sludge acoustic impedance, $Z_1$ represents water acoustic impedance, $Z_2$ represents dry sludge acoustic impedance, and i represents the sludge moisture content.

4. The method for measuring the sludge moisture content by ultrasound according to claim 3, wherein the measuring container is made of polymethyl methacrylate.

5. A system for measuring a sludge moisture content by ultrasound, comprising:
   a measuring container, configured to load sludge;
   a pulse signal generator, configured to generate a pulse signal;
   a STSR transducer, disposed on an outer wall of the measuring container, and configured to transmit a first ultrasonic signal into the measuring container loaded with the sludge under an excitation of the pulse signal and receive a second ultrasonic signal reflected from an inner wall of the measuring container; and
   a computer, configured to build a first formula representing a relationship among a reflection coefficient, sludge acoustic impedance, and wall acoustic impedance of the measuring container, and build a second formula representing a relationship between the sludge acoustic impedance and the sludge moisture content; calculate an amplitude ratio between the second ultrasonic signal and the first ultrasonic signal; take the amplitude ratio as the reflection coefficient to substitute into the first formula to obtain the sludge acoustic impedance; substitute the sludge acoustic impedance into the second formula to obtain the sludge moisture content; and output the sludge moisture content to a sewage treatment plant to make the sewage treatment plant based on the sludge moisture content dewater the sludge until a moisture content of the sludge is less than 80%;
   wherein the first formula is as follows:

$Z_w = Z_{arc}(1+R)/(1-R)$;

where R represents the reflection coefficient, $Z_w$ represents the sludge acoustic impedance, and $Z_{arc}$ represents the wall acoustic impedance of the measuring container;
   wherein the second formula is as follows:

$i = (Z_w - Z_2)/(Z_1 - Z_2)$;

where $Z_w$ represents the sludge acoustic impedance, $Z_1$ represents water acoustic impedance, $Z_2$ represents dry sludge acoustic impedance, and i represents the sludge moisture content.

* * * * *